United States Patent [19]

Jensen et al.

[11] Patent Number: 5,537,934
[45] Date of Patent: Jul. 23, 1996

[54] CATIONICALLY STABILIZED SLURRIES OF CALCINED KAOLIN CLAY

[75] Inventors: Amy S. Jensen, Macon; Paul R. Suitch, Milledgeville; Sanjay Behl, Macon, all of Ga.

[73] Assignee: Engelhard Corporation, Iselin, N.J.

[21] Appl. No.: 325,724

[22] Filed: Oct. 19, 1994

[51] Int. Cl.⁶ ............................................. C04B 14/10
[52] U.S. Cl. .................... 106/487; 106/416; 106/486; 501/147; 501/148
[58] Field of Search ........................ 106/486, 487, 106/416; 501/146, 147, 148

[56] References Cited

U.S. PATENT DOCUMENTS

| | | | |
|---|---|---|---|
| 3,014,836 | 12/1961 | Proctor | 162/181 |
| 3,021,195 | 2/1962 | Podschus et al. | 23/110 |
| 3,130,063 | 4/1964 | Millman et al. | 106/308 |
| 3,309,214 | 3/1967 | Podschus et al. | 106/288 |
| 3,519,453 | 7/1970 | Morris et al. | |
| 3,586,523 | 6/1971 | Fanselow et al. | 106/288 B |
| 3,663,461 | 5/1972 | Witt | 260/2 BP |
| 3,754,712 | 8/1973 | Cecil | 241/16 |
| 3,804,656 | 4/1974 | Kaliski et al. | 106/487 |
| 4,107,325 | 8/1978 | Bellini et al. | 424/301 |
| 4,118,245 | 10/1978 | Hamill et al. | 106/28 B |
| 4,118,246 | 10/1978 | Horzepa et al. | 106/288 B |
| 4,118,247 | 10/1978 | Marchetti et al. | 106/308 |
| 4,174,279 | 11/1979 | Clark et al. | 210/54 |
| 4,738,726 | 4/1988 | Pratt et al. | 106/487 |
| 4,772,332 | 9/1988 | Nemeh et al. | 106/487 |
| 4,859,246 | 8/1989 | Sennett | 106/487 |
| 5,006,574 | 4/1991 | Sennett et al. | 523/351 |
| 5,112,782 | 5/1992 | Brown et al. | 106/487 |

FOREIGN PATENT DOCUMENTS 1181491  9/1967  European Pat. Off. ........ C01B 33/26

OTHER PUBLICATIONS

Grimshaw "The Chemistry & Physics of Clays and Allied Ceramic Materials", Fourth edition, Wiley–Interscience, N.Y, 1971, p. 473.

Primary Examiner—Karl Group
Assistant Examiner—Michael Marcheschi

[57] ABSTRACT

A method for preparing high solids suspensions of calcined clay which are stable without the necessity of adding a colloidal thickening agent and have minimal dilatancy. A calcined kaolin clay pigment, substantially free of anionic dispersant, is dispersed in water by addition of alkali to provide a neutral to mildly alkaline aqueous slurry. To the dispersed slurry, a water-soluble cationic organic polymer is added in minor amounts, to partially flocculate and thicken the slurry, thereby stabilizing the slurry against sedimentation.

6 Claims, 4 Drawing Sheets

CATIONICALLY STABILIZED SLURRIES OF CALCINED KAOLIN CLAY

FIELD OF THE INVENTION

This invention relates to improved aqueous slurries of calcined clay pigments and to the preparation thereof.

BACKGROUND OF THE INVENTION

Kaolin clay pigments used by the paper and paint industry are available in both uncalcined and calcined grades, both of which bear a negative charge when dispersed in water. When preparing aqueous coating or paper filling compositions containing such pigments, it is frequently desirable to provide the clay in the form of a concentrated suspension (slurry) which is sufficiently fluid at both high and low rates of shear to be handled by conventional mixers and pumps.

In the manufacture of paper and paper board, it is well-known to incorporate quantities of inorganic fillers into the fibrous web in order to improve product quality. Titanium dioxide is widely used to improve brightness and opacity, but it is an expensive pigment. In recent years, considerable efforts have been made to develop satisfactory replacements for titanium dioxide. Substantially anhydrous kaolin clays prepared by partially or fully calcining a fine particle size fraction of crude kaolin clay is now a replacement pigment of choice. Calcined kaolin clay opacifying pigments, such as the products supplied under the registered trademarks ANSILEX and ANSILEX 93 by Engelhard Corporation are exemplary. These products are substantially anhydrous white pigments and are widely used as fillers in paper sheets and paper board, as a coating pigment for paper, and as a pigment in paints and other filled systems. They consist of aggregates of clay particles, and exhibit exceptionally high light-scattering and opacifying characteristics when incorporated as a filler into paper. The particle size of these pigments is typically at least 65 percent by weight finer than 2 micrometers equivalent spherical diameter (ESD), and at least 50 percent by weight finer than 1 micrometer. The pigments exhibit low Valley abrasion values, generally less than 50 mg., and usually below 30 mg.

It is desirable to be able to ship high solids slurries of calcined clay pigments in tank cars. A high degree of fluidity is required as it is with conventional hydrated kaolin pigments. In many instances, slurry shipments must be sufficiently fluid to flow out of tank cars under the influence of gravity alone. Such phenomena as thickening, gel formation, and sedimentation are undesirable because they impair or prevent gravity flow.

When the kaolin is not calcined and has a limited content of particles larger than 2 micrometers (equivalent spherical diameter), it relatively simple to produce a stable high solids (70 percent) suspension of the clay. A powerful anionic deflocculant such as a polyacrylate salt or tetrasodium pyrophosphate (TSPP) is added to a filter cake of acid negatively charged particles of clay, the cake being at about 60 percent solids. Additional dry clay is incorporated with agitation until the suspension has the desired high solids content. The TSPP is usually employed in an amount within the range of 0.3 percent to 0.5 percent based on the dry clay weight. This corresponds to the use of 6 to 10 lbs. TSPP/ton of clay. Typically, the pH of such slurries is in the range of 6.5– 8.5. Such suspensions are stable in the sense that there is minimal settling of particles to form a dense sediment and minimal formation of a clear or cloudy supernatant liquid layer when the suspension is allowed to stand. This is attributable to the fact that suspensions of the fine kaolin clay are fairly viscous and contain only small amounts of coarse particles. Few particles of clay, if any, have sufficient mass to settle under the influence of gravity.

However, when clay pigments contain significant amounts of coarse particles, especially particles larger than 2 micrometers, and the content of ultrafine particles is low, there is a marked tendency of coarse particles to settle out of deflocculated suspensions of the clay. For example, 70 percent solids deflocculated suspensions of filler grades of hydrated kaolin clay tend to form hard sediments during shipment or storage. These filler clays usually contain at least 20 percent by weight of particles larger than 5 micrometers and at least 35 percent larger than 2 micrometers.

High solids deflocculated suspensions of calcined clay pigments having particle size distributions similar to those of uncalcined filler clays tend to form hard sediments during storage. Furthermore, calcined clay pigments have unusual rheological properties and the problem of producing stable high solids suspensions is even more difficult than when a typical uncalcined clay is involved. Relatively coarse particle size calcined kaolin clay products such as SATINTONE® clay usually cannot even be prepared into suspensions containing more than 60 percent solids by conventional techniques without producing systems which are highly dilatant. In the case of ultrafine low abrasion grades, such as ANSILEX® pigment and SPECTRAFIL® pigment, fluid suspensions containing more than about 50 percent solids cannot be prepared without impairing the opacifying capacity of the material by subjecting the pigment to excessive mechanical action in dry or wet state. Dilatant systems obtained by slurrying ultrafine particle size grades of calcined kaolin clay resemble quicksand. When a stirring rod is dropped into a fluid concentrated slurry of calcined clay, it may be impossible to extricate the stirring rod unless the stirring rod is removed very slowly. The shearing force applied to the suspension results in the conversion of the originally fluid system into a mass which becomes increasingly viscous as the rate of shear increases. Processing equipment such as mixers and pumps would be damaged by such highly dilatant suspensions or the equipment would stop operating.

A conventional method of maintaining various particulate solids in suspension in fluid media is to thicken the suspending media with suitable colloidal additives. This principle has been advocated to prevent sedimentation in high solids suspensions of filler grades of uncalcined clay. In accordance with the teachings of U.S. Pat. No. 3,130,063 to Millman et. al., an organic polymeric thickening agent, preferably CMC, is added to a previously deflocculated suspension of coarse filler clay in amount sufficient to thicken (and thereby stabilize) the suspension. Anionic dispersants (deflocculating agents) are used. However, organic polymers such as CMC are subject to bacterial degradation. Consequently, clay slurries stabilized with such polymers may arrive at their destination in the form of gray or black masses having a putrid odor. Obviously, it is desirable to avoid stabilizing a deflocculated clay suspension with such thickening agents for the reason alone that preservatives are costly.

It has been suggested (U.S. Pat. No. 3,014,836 to Proctor) to reduce the viscosity of calcined clay pigments by milling the calcined clay under wet or dry conditions. The preferred procedure, as set forth in the patent, is to deflocculate a 55 percent to 60 percent solids suspension of the calcined clay with a conventional amount of a dispersant (0.3 percent TSPP) and ball mill the suspension for 12 to 24 hours. The slip of ballmilled clay is then flocculated by adding acid or alum. The flocculated calcined clay is subsequently dried and then is mixed with water and dispersing agent to produce a 70 percent solids suspension. Proctor did not attempt to produce directly the desired 70 percent solids suspensions of calcined clay and he was not concerned with the sedimentation properties of his suspensions. Furthermore, Proctor did not address the problem resulting from the fact that milling would impair the opacifying properties of the clay.

Similarly, U.S. Pat. No. 3,754,712 to Cecil is concerned with a method for preparing fluid high solids suspensions of calcined clay which are stable without the necessity of adding colloidal thickening agents. Cecil's process involves pebble milling a slurry of anionically dispersed calcined clay and gradually adding more clay to increase solids while the slurry is being milled. Cecil et. al. did not consider the fact that the milling impaired opacification. See also U.S. Pat. Nos. 4,118,245, (Hamil, et. al.) and 4,118,246 (Horzepa et. al.) Among the known dispersants disclosed in U.S. Pat. No. 4,118,246 are condensed phosphate, amino hydroxy compounds such as 2-amino, 2-methyl, 1-propanol (AMP), sodium citrate and sodium naphthalene formaldehyde condensates, alone or in combination.

Marchetti et. al., U.S. Pat. No. 4,118,247 addresses the problem unique to the preparation of slurries of acidic, acid-treated montmorillonite clay pigments. A combination of condensed phosphate and AMP or other amino alcohol is used as the dispersant. In a preferred embodiment, the slurries also contain calcined kaolin clay pigments in major or minor amounts.

In accordance with U.S. Pat. No. 4,107,325 to Eggers, aqueous slurries containing 50 percent or more of calcined clay are prepared by employing a mixture of the calcined clay with a significant amount of uncalcined kaolin clay. Practice of the invention necessitates the use of large amounts of additives including dispersants (and suspending agents). This technique necessitates dilution of the calcined clay with substantial amounts of hydrated clay and thus limits the utility of the products for some end use applications. Furthermore, the high solids slurries were undesirably dilatant.

U.S. Pat. No. 3,804,656 to Kaliski teaches the use of combinations of normally-used anionic dispersants along with nonionic surfactants and cationic surfactants to provide stable pigment slurries. The slurries are only usable at high pH, at least 8 or higher, and preferably 8.5 to 11. In some cases pH values as high as 13 are stated to be desirable.

Commonly assigned U.S. Pat. No. 5,006,574, Sennett teaches a method for preparing a fluid stable aqueous slurry of particles of a calcined clay pigment suitable for use in coating or filling paper or as an extender pigment in paint. The processing includes the steps of providing dispersant-free particles of calcined kaolin clay and adding the particles to a solution of a water-soluble polymeric cationic dispersant in amount sufficient to impart a positive zeta potential to the particles of pigment and to result in a pH in the range of about 3 to 4. The dispersant is selected from the group consisting of alkyl diallyl quaternary ammonium salts, quaternary ammonium cationic polyelectrolytes obtained by copolymerizing aliphatic secondary amines with epichlorohydrin and poly (quaternary ammonium) polyester salts.

SUMMARY OF INVENTION

We have discovered a relatively inexpensive method for preparing high solids suspensions of calcined clay which are stable without the necessity of adding a colloidal thickening agent and have minimal dilatancy. Stated briefly, in accordance with this invention, a calcined kaolin clay pigment, substantially free of anionic dispersant, is dispersed in water by addition of alkali to provide a neutral to mildly alkaline aqueous slurry. To the dispersed slurry, a water-soluble cationic organic polymer is added in a minor amount, to partially flocculate and thicken the slurry, thereby stabilizing the slurry against sedimentation.

In a preferred embodiment of the invention, the calcined clay pigment is a fine particle size, low abrasion material. See, for example, U.S. Pat. No. 3,586,523 (Fanselow et al.), the teachings of which are incorporated herein by cross-reference.

Dispersed calcined kaolin slurries of this invention have a stable viscosity and no loss of opacity. Other benefits include: reduced chemical cost due to decreased primary dispersant dosages and reduced biocide demand (from eliminating the use of cellulose and sodium aliginate based thickeners). The invention produces a slurry having near neutral pH, whereas a cationically dispersed slurry of the prior art is acidic. Such a slurry of decreased anionic character and neutral pH should exhibit better retention during the papermaking process. Also slurries of the invention exhibit a slight improvement in scatter S457 (average 15%) which governs opacity and a noticeable improvement in high shear Hercules viscosity (up to 40%). Use of cationic polymers for slurry stability does not adversely affect GE Brightness or Einlehner Abrasion.

BRIEF DESCRIPTION OF THE DRAWINGS

The effect of time on the Brookfield viscosity and total weight of sediment of two slurries stabilized using two quaternary ammonium homopolymers is graphically depicted in FIGS. 1 and 2.

PREFERRED EMBODIMENTS

Figure 1:
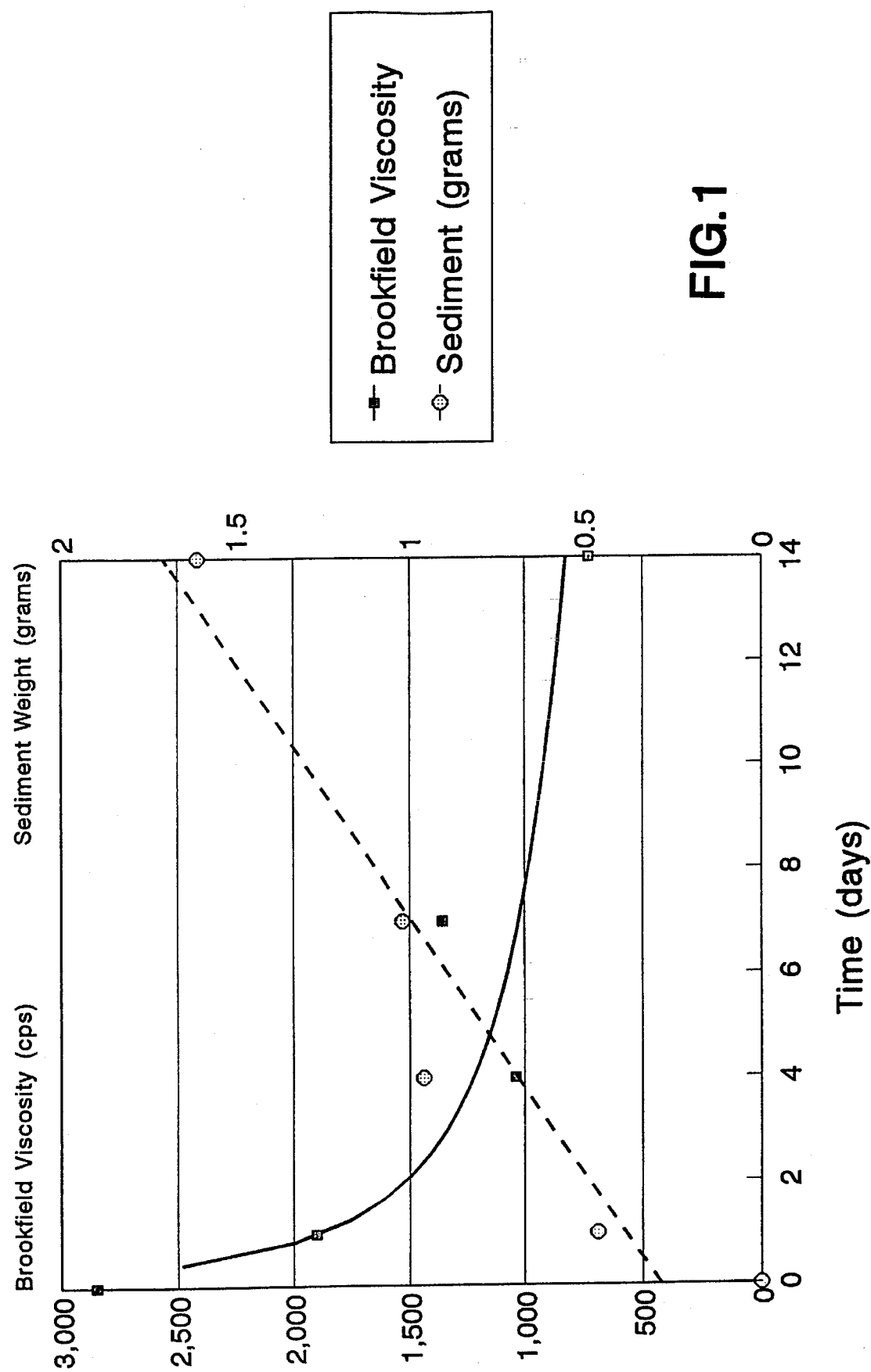

In accordance with this invention, a cationic polymer is utilized to effectively prevent a 49% to 62% solids slurry of calcined clay from settling. Addition rate of cationic polymer is typically 0.005% to 0.1% (dry basis), based on the weight of pigment, with 0.05% preferred. The 49% to 62% solids slurry is dispersed in water containing alkali (sodium hydroxide preferred) at 0.005% to 0.075% (weight, dry basis), based on the weight of clay pigment. A preferred quantity of alkali is 0.025% (dry basis). A Cowles mixing system (or equivalent) is utilized to achieve the desired high shear rheology and pH level. A pH of about 7.5 before addition of cationic polymer is preferred. Thereafter the cationic polymer is added under low shear agitation (preferred) to maintain the long chain structure of the polymeric molecule. The preferred pH of the slurry after cationic addition is 6.5 to 7.0.

As the cationic is added to the calcined clay slurry, the Brookfield viscosity increases, typically to approximately 3000 cps. It has been hypothesized that this effect is the result of the creation of a very loose floc structure consisting mainly of coarse fraction particles. However, as the contact time between the polymer and the slurry increases, the fine particle fraction begins to flocculate thereby coarsening the overall floc structure. This occurs about 24 to 48 hours after cationic addition and is characterized by a decrease in Brookfield viscosity of as much as 50%. As the floc structure coarsens more, the viscosity drops further and finally equilibrates at around 700 cps after 7 days. The final Brookfield viscosities of all samples prepared during the research period were within the range of 300–750 cps. This insures adequate stabilization of the slurry over time and a significant cost savings by removing the anionic dispersant and the colloidal thickener from the slurry formulation.

The invention is of special benefit when used with low abrasion ultrafine particle size calcined clay (e.g., calcined clay in which about 88 percent is finer than 2 micrometers and at least about 50 percent is finer than 1 micrometer), exemplified by ANSILEX® and ANSILEX 93® pigments. Coarse particle size calcined clay within the scope of the invention may contain from 0 percent to 30 percent by weight of particles larger than 5 micrometers (ESD) and at least 35 percent larger than 2 micrometers.

As used in this specification, the term "calcined kaolin clay pigment" includes all kaolin clays which have been heated to over 400° C. to render same dehydroxylated. The term thereby embraces fully calcined kaolins—which usually have been heated above 980° C. exotherm, as well as so-called "metakaolin", which results from heating to lower temperatures below the exotherm. Reference is made to Fanselow et al, U.S. Pat. No. 3,586,523 and to Morris U.S. Pat. No. 3,519,453; Podschus, U.S. Pat. Nos. 3,021,195 and 3,309,214, and British Pat No. 1,181,491. Some of these patents are concerned with kaolin pigments which are calcined at lower temperatures and which therefore can be regarded as metakaolins. Generally, the pH of the calcined pigments (20 percent solids slurries with no dispersant added, using deionized water to form slurries) is in the range of 4 to 7, more usually 5 to 6.

Prior to slurry formation according to our invention, the calcined clay may be blended with minor amounts (e.g., 1 percent to 20 percent based on the weight of the clay) of mineral pigments such as titania and/or uncalcined (hydrous) kaolin.

The process of the present invention is conveniently carried out by adding a dispersant effective amount of alkali to the required amount of water for the desired solids level in a container equipped with a stirrer. After the calcined kaolin is added to a predetermined solids level, additional dispersant may be added to bring the pH of the slurry into the neutral to slightly basic range. Finally, the cationic polymer is added under low agitation to give a smooth, uniform, fluid suspension. If necessary, the slurry may be passed through a sieve to remove any undispersed aggregates or coarse impurities prior to adding the cationic polymer.

Primary dispersion must occur with an alkali such as sodium hydroxide, ammonium hydroxide, potassium hydroxide or sodium carbonate or mixtures thereof. The final pH of the clay-water-dispersant system should be at least 7.5, but less than 8.0. If this is not the case, additional dispersant should be added to adjust the pH accordingly. This pH range has been determined to give the proper balance between the anionic and cationic species in the system, to insure the final Brookfield viscosity falls into the desired range.

Anionic and nonionic polyelectrolytes cannot be used as primary dispersants since they will counteract the ability of the cationic to thicken. This is the basis of the teachings of Kaliski et al (U.S. Pat. No. 3,804,656). Kaliski discovered that a reliable dispersant could be formulated by blending nonionic and cationic surfactants. During slurry preparation, Kaliski uses a nonionic surfactant to counteract the thickening phenomenon, associated with the cationic addition. Our invention takes full advantage of this thickening phenomenon, which serves to stabilize the calcined clay slurry. Our research has led to the conclusion that the correct cationic polymer dosage is dependent upon the level and strength of alkali used as the primary dispersant. The desired thickening effect will occur if the pH of the slurry before cationic addition is at least 7.5 and the pH after cationic addition is at least 6.5, when using polyamines or diallyl dimethyl ammonium salts as the cationic species.

Cationic thickening agents used in the practice of this invention include low molecular weight polyamines (ethylene diamine or hexamethylene diamine), long carbon chain amines (quaternary polyamines having a pH of 7 or less) and polydadmacs (diallyl dimethyl ammonium chloride salts). Most cationic polymers are supplied commercially under trade designations and exact chemical structure and molecular weight are proprietary.

Cationic polyelectrolytes having a pH of 7 or less are characterized by a high density of positive charge.

Positive charge density is calculated by dividing the total number of positive charges per molecule by the molecular weight. Generally the high charge density of polyelectrolytes exceeds 1000 and such materials do not contain negative groups such as carboxyl or carbonyl groups. In addition to alkyl diallyl quaternary ammonium salts, other cationic quaternary ammonium cationic polyelectrolytes are obtained by copolymerizing aliphatic secondary amines with epichlorohydrin. See U.S. Pat. No. 4,174,279. Compounds formed through this reaction can either be classified as polyamines or as quaternary salts, depending upon the amount of reaction that has taken place. Certain polymers used in this invention are typically referred to as "quaternary polyamines" because they are a combination of the intermediate reaction product, a polyamine, and the final reaction product, a quaternary salt. Still other water soluble cationic polyelectrolytes are poly(quaternary ammonium) polyester salts that contain quaternary nitrogen in a polymeric backbone and are chain extended by the groups. They are prepared from water-soluble poly(quaternary ammonium salts) containing pendant hydroxyl groups and bifunctionally reactive chain extending agents; such polyelectrolytes are prepared by treating and N, N, N(1), N(1) tetraalkylhydroxyalkylenediamene and an organic dihalide such as a dihydroalkane or a dihaloether with an epoxy haloalkane. Such polyelectrolytes and their use in flocculating clay are disclosed in U.S. Pat. No. 3,663,461.

The aforementioned cationic materials are used at appropriate dosages to flocculate negatively charged clays. See, for example. U.S. Pat No. 4,738,726 (Pratt et. al.), and references cited therein. It should be noted that as incremental dosages of such cationic materials are added to anionically charged particles, the initial effect is that of flocculation. As dosages increase beyond the levels at which flocculation occurs, dispersion (deflocculation) occurs and the charge on the particles becomes positive. Deflocculation is to be avoided when practicing the present invention.

This invention can be transferred to production scale by adding the cationic polymer to 50% solids slurry of clay pigment using in-line mixing technology or by pumping slurry product to a let down tank containing an impeller. Until the slurry has a chance to reach charge equilibrium, (within 24–48 hours) the Brookfield viscosity after addition of cationic reagent can reach 2000+ cps measured using a #2 spindle at 20 rpm. This factor must be kept in mind when attempting to pump the freshly treated product to the chosen storage facility. This consideration can be omitted when in-line mixing technology is utilized to treat the slurry during loading into railroad tank cars. This will enable the slurry to age in transit and be easily pumped upon arrival at the customer site.

EXAMPLE 1

A ·51% solids slurry of ANSILEX 93® calcined kaolin clay was prepared by adding 500 grams of clay to 474 grams of water containing 0.83 grams of 15% NaOH solution. The pH of the resulting slurry was 7.8. The slurry was mixed in a Cowles mixing system long enough to achieve a high shear viscosity of at least 300 rpm at 16 dynes. A quaternary polyamine type cationic polymer (Sharpe C-1, Sharpe Chemical Company; Molecular Weight 300,000) was added at a dosage of 0.05% (25 grams of 1% solution) under low shear using a standard propeller type mixing blade. Low shear addition is critical to maintain the structural integrity of the long chain polymer/clay flocs since these flocs are the primary stabilizing mechanism for the slurry.

Brookfield viscosity was measured at 0, 1, 4, 7 and 14 days using a #2 spindle at 20 rpm. A pour test was also conducted during this time period to determine if any settling occurred. This test was accomplished by first determining the as is weight of the vessel in which the slurry is to be aged. Thereafter, at prescribed time intervals, the slurry was poured into an alternate container and the vessel reweighed. The sediment weight was determined by subtracting the weight of the clean vessel from this weight. This test determines both the total weight of sediment and the average rate at which the settling occurred during the specified time period.

FIG. 1 illustrates the aging history of a 50% solids slurry stabilized with a quaternary polyamine type polymer having an approximate molecular weight of 300,000. Initial Brookfield viscosity is near 3,000 cps. The viscosity of the slurry rapidly decreases to around 1500 cps during the initial 48 hour aging period and levels off to around 800 cps after aging for 8 days. The slurry has minimal dilatancy and can be easily pumped at viscosities less than 1200 cps. FIG. 1 also illustrates sedimentation history as a function of time. The total percent sediment was 0.27% and the average settling rate was 0.115 grams per day.

EXAMPLE 2

A 51% solids slurry of ANSILEX 93® calcined clay was prepared as in Example 1 except that 261LV polymer supplied by Calgon Corporation was used as the cationic polymer. 261LV polymer is diallyl dimethyl ammonium chloride having a molecular weight of 250,000. The polymer was added at a dosage of 0.05% (dry basis) under low shear. Brookfield viscosity was measured at 0, 1, 4, 7 and 14 days using a #2 spindle at 20 rpm. A pour test was also conducted.

Figure 2:
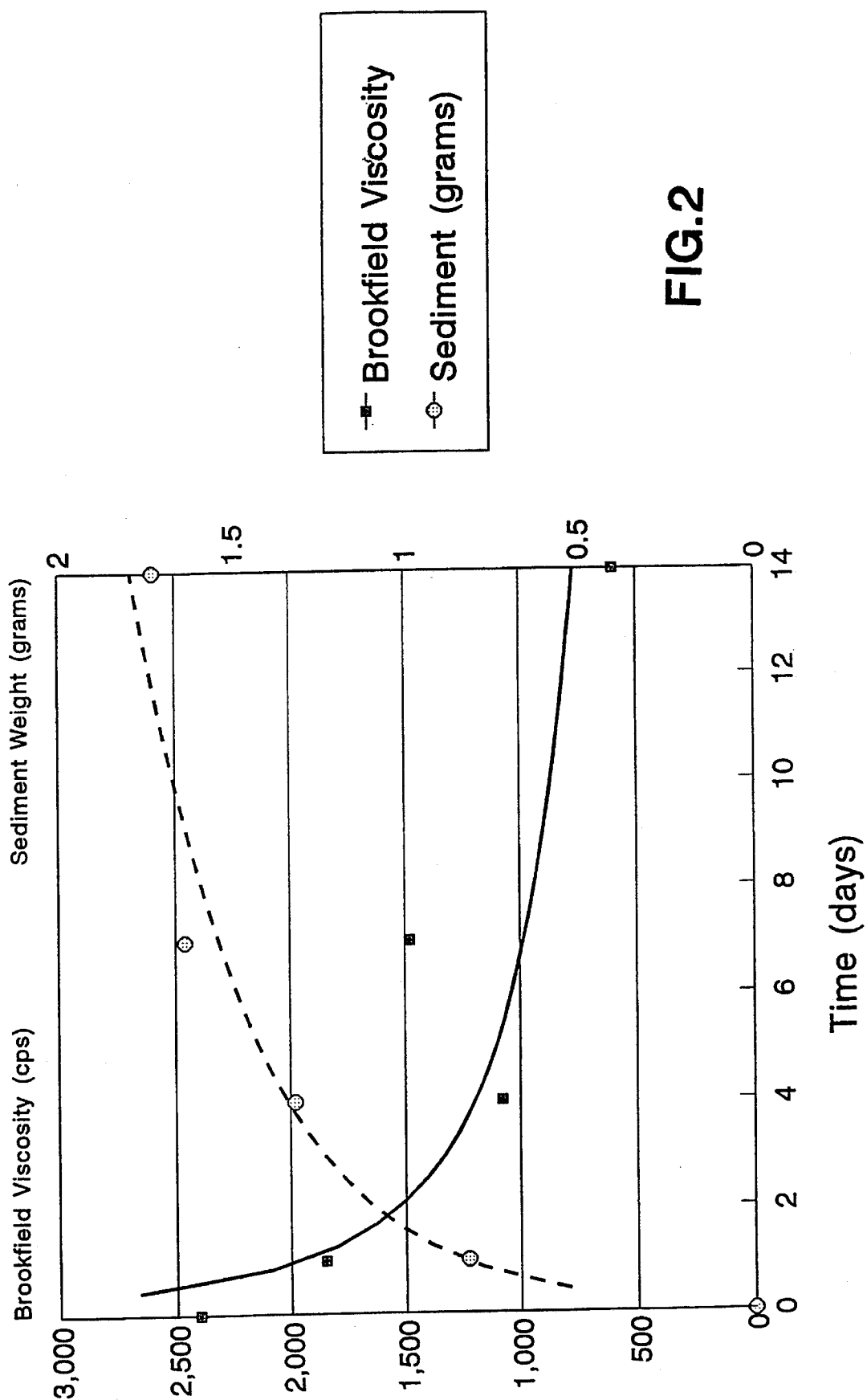
Figure 4:
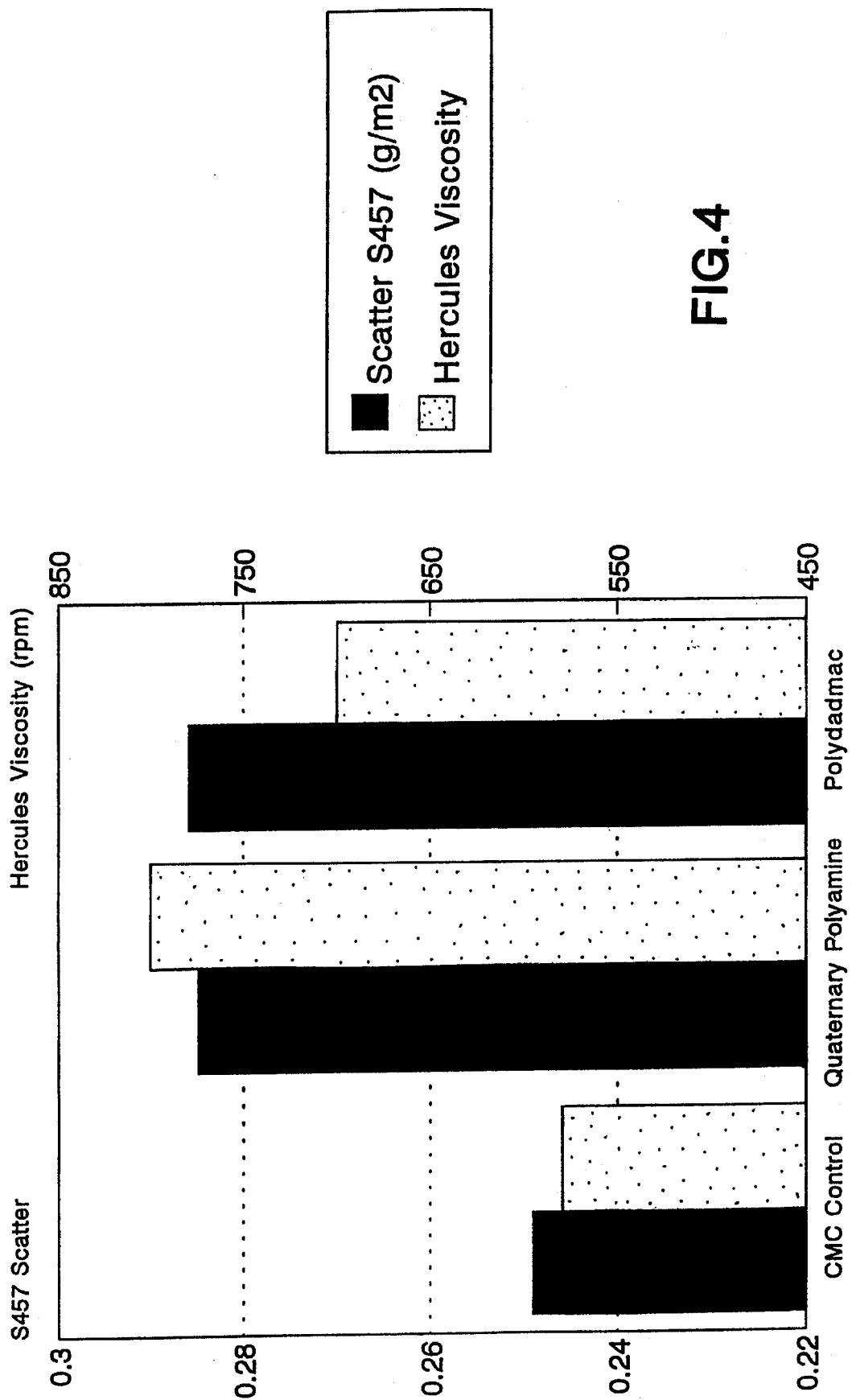
FIG. 4 illustrates the increase in scatter S457 and Hercules Viscosity of samples stabilized with both types of cationic polymers.

FIG. 2 illustrates the Brookfield viscosity and sedimentation history as a function of time. FIG. 2 shows the aging history of a 50% solids slurry stabilized with the polydadmac type polymer. Data in the figure shows that this sample exhibits similar properties to those demonstrated in FIG. 1. Initial Brookfield viscosity was approximately 2500 cps and decreased rapidly to around 1500 after 48 hours. After 8 days, the viscosity of the slurry was stable at around 600 cps. Viscosities for this sample are slightly lower across the board than those in Example 1 due to the lower molecular weight of this cationic polymer. The final Brookfield viscosity after 14 days was 600 cps. The total percent sediment was 0.29% and the average settling rate was 0.123 grams per day. These results indicate that the cationic polymer at a dosage of 0.05% (dry basis) was sufficient to prevent calcined clay slurry samples from settling. Its performance compared favorably to the properties of a control stabilized with CMC which had a final Brookfield viscosity of 900 cps, a total percent sediment of 0.29% and an average of settling of 0.112 grams per day. FIG. 4 illustrates a 15% increase in scatter and a 20% increase in Hercules viscosity associated with the use of this polymer.

EXAMPLE 3

Figure 3:
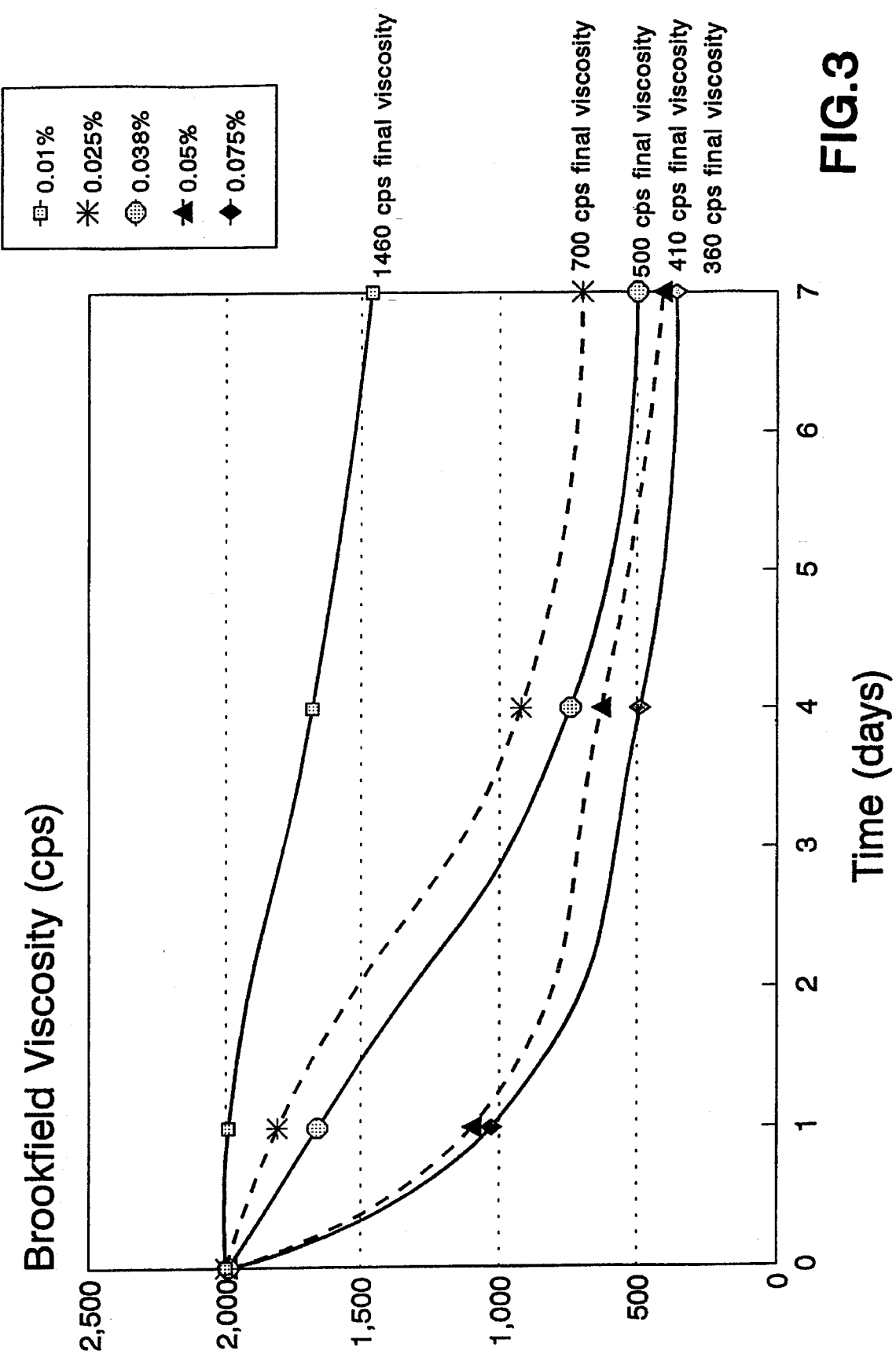
FIG. 3 demonstrates the aging behavior of a 50% solids slurry as a function of primary dispersant dosage.

A sample of ANSILEX 93® calcined clay slurry was prepared by adding 500 grams of clay to 474 grams of water containing 0.35 grams of 15% NaOH solution (0.01% dry basis) as the primary dispersant. The material was mixed and the quaternary polyamine type cationic polymer added as described in Example 1. Brookfield viscosity was measured after 0, 1, 4 and 7 days using a #2 spindle at 20 rpm. Additional samples were prepared in the same manner; however, the amount of sodium hydroxide added was incrementally increased. Four additional samples were prepared using 0.025%, 0.038%, 0.05% and 0.075% (dry basis) NaOH dosages. Brookfield viscosity was measured after 0, 1, 4 and 7 days using a #2 spindle at 20 rpm. Final results of the investigation are illustrated in FIG. 3. Data in this figure indicate that the preferred dosage of NaOH is 0.025%. This dosage gives a slurry with a 7 day Brookfield viscosity of 700 cps. Larger amounts of sodium hydroxide tend to increase the anionic character of the slurry which destabilizes it at the preferred cationic dosage of 0.05%. Larger amounts of sodium hydroxide in the slurry would necessitate high dosages of cationic stabilizer which is not cost effective.

EXAMPLE 4

FIG. 4 illustrates two additional benefits that occur as a result of using cationic polymers to stabilize slurries of calcined clay. First, approximately a 15% increase is exhibited in scatter measured at 457 nm wavelength when using a polydadmac type cationic polymer to stabilize slurries as compared to those stabilized with CMC. Secondly, a 40% increase in Hercules viscosity is also obtained when using the cationic polymer. These two properties are generally considered to be inversely proportional. An increase in Hercules viscosity is usually achieved at the expense of Scatter S457; vice versa, a slurry of exceptional light scattering ability has poor high shear rheology. A high Hercules viscosity is desirable to maintain high pumping rates when transloading the material to different storage facilities or during processing. Conventional methods for improving Hercules viscosity involve subjecting he slurry to intense mechanical action which serves to break apart the aggregates of particles and hereby decreases scatter. This invention presents an alternative to conventional methods by illustrating means for increasing both Hercules viscosity and scatter S457.

We claim:

1. A method for preparing a fluid, stable, high solids aqueous slurry of particles of a calcined clay pigment, which comprises adding an alkali metal hydroxide to a slurry of particles of calcined kaolin clay, said slurry containing from 49% to 62% by weight calcined kaolin, sufficient base being added to disperse said clay and result in a pH in the range of 7.5 to less than 8.0, thereafter adding to the resulting dispersed slurry a solution of water soluble cationic polymer in amount sufficient to flocculate and thicken said slurry and produce a PH in the range of 6.5 to 7.0, said amount of polymer being such that the Brookfield viscosity of said slurry decreases to a value of at least 300 cps after said slurry is aged, such Brookfield viscosity being measured with #2 spindle at 20 rpm.

2. The method as claimed in claim 1 wherein said base is added in amount in the range of 0.005 to 0.075 percent based on the dry weight of the calcined clay.

3. The method of claim 1 where said cationic polymer is selected from the group consisting of polyamine, cationic poly (quaternary ammonium) compound and mixtures thereof.

4. The method of claim 1 wherein said cationic polymer is polydiallyldimethyl ammonium chloride.

5. The method of claim 1 wherein said cationic polymer is added under low shear mixing.

6. The method of claim 1 wherein calcined kaolin is the sole pigment in said slurry.

* * * * *